US008767890B2

(12) United States Patent
Park et al.

(10) Patent No.: US 8,767,890 B2
(45) Date of Patent: Jul. 1, 2014

(54) APPARATUS AND METHOD FOR ANALYZING IDENTIFICATION SIGNAL BASED ON PARTIAL CORRELATION

(75) Inventors: Sung-Ik Park, Daejon (KR); Jae-Young Lee, Seoul (KR); Jae-Hyun Seo, Daejon (KR); Ho-Min Eum, Daejon (KR); Heung-Mook Kim, Daejon (KR); Jong-Soo Lim, Daejon (KR); Soo-In Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1216 days.

(21) Appl. No.: 12/447,736

(22) PCT Filed: Oct. 12, 2007

(86) PCT No.: PCT/KR2007/005015
§ 371 (c)(1),
(2), (4) Date: Dec. 7, 2009

(87) PCT Pub. No.: WO2008/054073
PCT Pub. Date: May 8, 2008

(65) Prior Publication Data
US 2010/0091908 A1    Apr. 15, 2010

(30) Foreign Application Priority Data

Oct. 31, 2006  (KR) .................. 10-2006-0106526

(51) Int. Cl.
*H03D 1/00* (2006.01)
*H04L 27/06* (2006.01)

(52) U.S. Cl.
USPC ........... 375/343; 375/340; 370/320; 370/335; 370/342; 370/441; 370/515; 708/300; 708/422; 708/813; 708/819

(58) Field of Classification Search
None
See application file for complete search history.

(56) References Cited

U.S. PATENT DOCUMENTS 4,876,737 A * 10/1989 Woodworth et al. ........ 455/12.1
5,127,020 A *  6/1992 Kurihara .................... 375/151
(Continued)

FOREIGN PATENT DOCUMENTS

EP    0 930 723 A2   7/1999
JP    2000-059268 A  2/2000
(Continued)

OTHER PUBLICATIONS

International Search Report; mailed Jan. 9, 2008; PCT/KR2007/005015.

*Primary Examiner* — Shuwang Liu
*Assistant Examiner* — Gina McKie
(74) *Attorney, Agent, or Firm* — Ladas & Parry LLP

(57) ABSTRACT

Provided is an apparatus and method for analyzing identification (ID) signals by converting radio frequency (RF) signals which are transmitted with an ID signal added thereto by a transmitting part, e.g., a plurality of transmitters or repeaters, into signals of a desired band; creating ID signals that are identical to the ID signals added to the RF signals; calculating correlation values between the converted signals and the created ID signals based on partial correlation; and extracting channel profile of multi-path signals caused by a channel between the transmitting part and the ID signal analyzing apparatus from the correlation value. The technology of the present research is applied to broadcasting and communication.

12 Claims, 6 Drawing Sheets

(56) References Cited

U.S. PATENT DOCUMENTS

| | | | |
|---|---|---|---|
| 5,920,808 A * | 7/1999 | Jones et al. | 455/127.1 |
| 5,977,913 A * | 11/1999 | Christ | 342/465 |
| 2001/0014133 A1 | 8/2001 | Taverdet | |
| 2001/0021199 A1 | 9/2001 | Lee et al. | |
| 2005/0117070 A1 * | 6/2005 | Wu et al. | 348/725 |
| 2005/0286661 A1 | 12/2005 | Kwak | |
| 2006/0203944 A1 * | 9/2006 | Kwak et al. | 375/343 |

FOREIGN PATENT DOCUMENTS

| | | |
|---|---|---|
| JP | 2006-222983 A | 8/2006 |
| KR | 1020010068996 A | 7/2001 |
| KR | 1020010070457 A | 7/2001 |
| KR | 1020050109043 A | 11/2005 |

* cited by examiner

APPARATUS AND METHOD FOR ANALYZING IDENTIFICATION SIGNAL BASED ON PARTIAL CORRELATION

TECHNICAL FIELD

The present invention relates to an apparatus and method for analyzing identification (ID) signals based on partial correlation; and, more particularly, to an apparatus and method for analyzing ID signals by converting radio frequency (RF) signals which are transmitted with an ID signal added thereto by a transmitting part, e.g., a plurality of transmitters or repeaters, into signals of a desired band; creating ID signals that are identical to the ID signals added to the RF signals; calculating correlation values between the converted signals and the created ID signals based on partial correlation; and extracting channel profile of multi-path signals caused by a channel between the transmitting part and the ID signal analyzing apparatus from the correlation value.

This work was partly supported by the Information Technology (IT) research and development program of the Korean Ministry of Information and Communication (MIC) and/or the Korean Institute for Information Technology Advancement (IITA) [2006-S-016-01, "Development of Distributed Translator Technology for Terrestrial DTV"].

BACKGROUND ART

In general, a main transmitter and repeaters are deployed in service coverage according to surrounding natural features/objects. Repeaters are disposed in an area where signals from a main transmitter are received weak, which is called a weak signal reception area, to resolve unstable signal reception and broaden a signal transmission area, or coverage, of the main transmitter.

FIG. 1 illustrates an example of a service employing conventional repeaters. The drawing shows how repeaters repeat signals using different frequencies.

Referring to FIG. 1, in the service using conventional repeaters, signals are transmitted from a main transmitter 101 through transmission frequency A, and repeaters 102 to 105 repeats the signals using frequencies B, C, D and E that are different from the transmission frequency A. However, the repeaters illustrated in FIG. 1 resolve unstable signal reception in a weak signal reception area and broaden the signal transmission coverage, using the different frequencies B, C, D and E for the respective repeaters. The repeaters 102 to 105 use a plurality of frequency bands, and this is inefficient from the perspective of frequency utility because it requires much frequency resources.

If a broadcasting service is provided and a plurality of repeaters use the same frequency band as the main transmitter does, the frequency utility efficiency will be highly efficient because the frequency is reused in neighboring area.

FIG. 2 illustrates another example of a service employing conventional repeaters. The drawing shows a service using on-channel repeaters repeating signals through the same frequency.

To be specific, a main transmitter 201 transmits signals through a transmission frequency A, and on-channel repeaters 202 to 205 repeat the signals in the same frequency as the transmission frequency A. The service using on-channel repeaters, however, requires high isolation between a transmission antenna and a reception antenna. Thus, there are restraints that it can hardly use existing signal transmission facility and that it requires high capital investment.

Meanwhile, distributed repeaters (DTxR) can build up a distributed repeat network in a short time, maximally utilizing existing signal transmission facility. The use of the distributed repeaters is cost-efficient and can increase frequency utility efficiency.

FIG. 3 illustrates an example of a service employing conventional distributed repeaters. A main transmitter 301 sends out broadcasting signals through a transmission frequency A, and distributed repeaters 302 to 305 repeat the broadcasting signals through a frequency B that is different from the transmission frequency A.

When a network is configured using on-channel repeaters or distributed repeaters, frequency utility efficiency may be increased because frequency can be reused. However, there is a problem that interference occurs on adjacent repeaters because a single frequency is used between a transmitter and a repeater or between repeaters. To resolve the problem, an identification (ID) signal with an excellent correlation characteristic is assigned to the transmitter and the repeaters, adds the ID signal to the broadcasting signals, and transmits the broadcasting signals. Desired signals can be detected using an ID signal analyzing apparatus, in spite of interference caused by other signals.

Herein, since a sequence used as the ID signal is embedded to broadcasting signal in the form of spread spectrum to minimize the influence of existing service signals, a high bit resolution is required to represent the ID signals. Also, a long sequence is used as the ID signal to acquire excellent correlation characteristic. For example, in the Advanced Television System Committee (ATSC) system, which is the digital broadcasting system of the United States, a Kasami sequence having a length of 64896 is used as an ID signal, and it is added 21 to 39 dB smaller than the signal power of the main broadcasting service signals. An ID signal analyzing apparatus requires a much computation amount to detect and analyze an ID signal. In short, the ID signal analyzing apparatus requires high complexity.

Therefore, it is desperately needed to develop an ID signal analyzing apparatus having a low complexity to analyze an ID signal having high bit resolution and long length.

DISCLOSURE OF INVENTION

Technical Problem

An embodiment of the present invention is directed to providing an apparatus and method for analyzing identification (ID) signals by converting radio frequency (RF) signals which are received with ID signals added thereto from a transmitting part, e.g., a plurality of transmitters or repeaters, into signals of a desired band; creating ID signals that are identical to the ID signals added to the RF signals; calculating correlation values between the converted signals and the created ID signals based on partial correlation; and extracting channel profile of multi-path signals caused by a channel between the transmitting part and the ID signal analyzing apparatus from the correlation values.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an apparatus for analyzing identification (ID)

signals, which includes: a receiver for receiving signals with an ID signal added thereto from a transmitting part; a signal converter for converting the received signals into signals of a desired band; an ID signal generator for generating ID signals that are identical to the ID signals added by the transmitting part to the received signals; a partial correlator for calculating correlation values between the converted signals acquired in the signal converter and the created ID signals acquired in the ID signal generator based on partial correlation; and extracting channel profile from the correlation values acquired in the partial correlator.

In accordance with another aspect of the present invention, there is provided a method for analyzing ID signals, which includes the steps of: a) receiving signals with an ID signal added thereto; b) converting the received signals into signals of a desired band; c) generating ID signals that are identical to the ID signals added to the received signals; d) calculating correlation values between the converted signals acquired from the signal conversion step b) and the created ID signals acquired in the ID signal generation step c) based on partial correlation; and e) extracting channel profile from the correlation values acquired in the partial correlation step d).

Advantageous Effects

The present invention described above realizes an identification (ID) signal analyzing apparatus having low complexity to analyze an ID signal having high bit resolution and long length.

To be specific, the ID signal analyzing apparatus analyzes an ID signal by converting a radio frequency (RF) signal which is transmitted with an ID signal from a transmitting part, e.g., a plurality of transmitters or repeaters, into a signal of a desired band; creating an ID signal that is the identical to the ID signal added to the RF signal; calculating a correlation value between the converted signal and the created ID signal based on partial correlation; and extracting a channel profile of a multi-path signal caused by a channel between the transmitting part and the ID signal analyzing apparatus from the correlation value.

MODE FOR THE INVENTION

The advantages, features and aspects of the invention will become apparent from the following description of the embodiments with reference to the accompanying drawings, which is set forth hereinafter. When detailed description on a related art may unnecessarily obscure the points of the present invention, the description will not be provided herein. Hereinafter, specific embodiments of the present invention will be described in detail with reference to the accompanying drawings.

Figure 1:
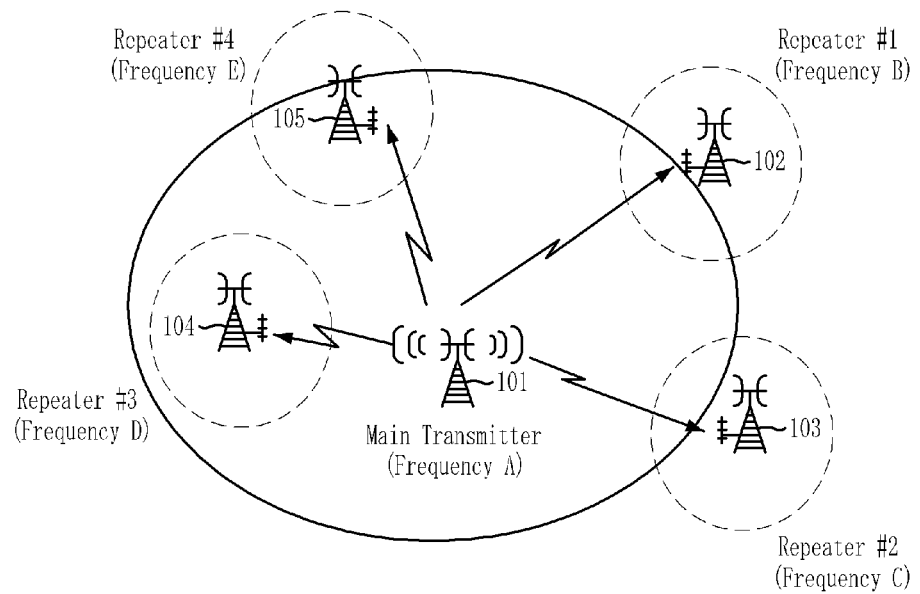
FIG. 1 illustrates an example of a service employing conventional repeaters.
Figure 2:
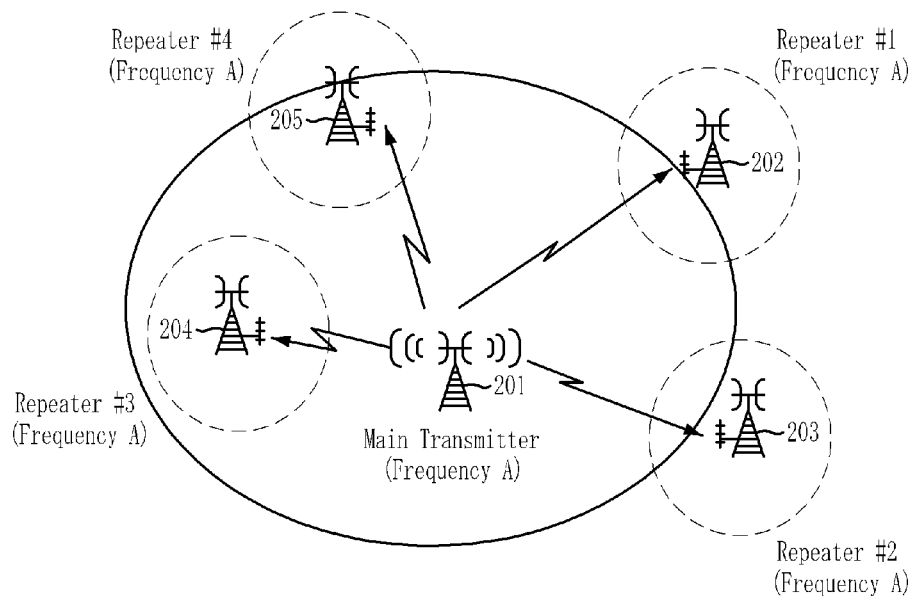
FIG. 2 illustrates another example of a service employing conventional repeaters.
Figure 3:
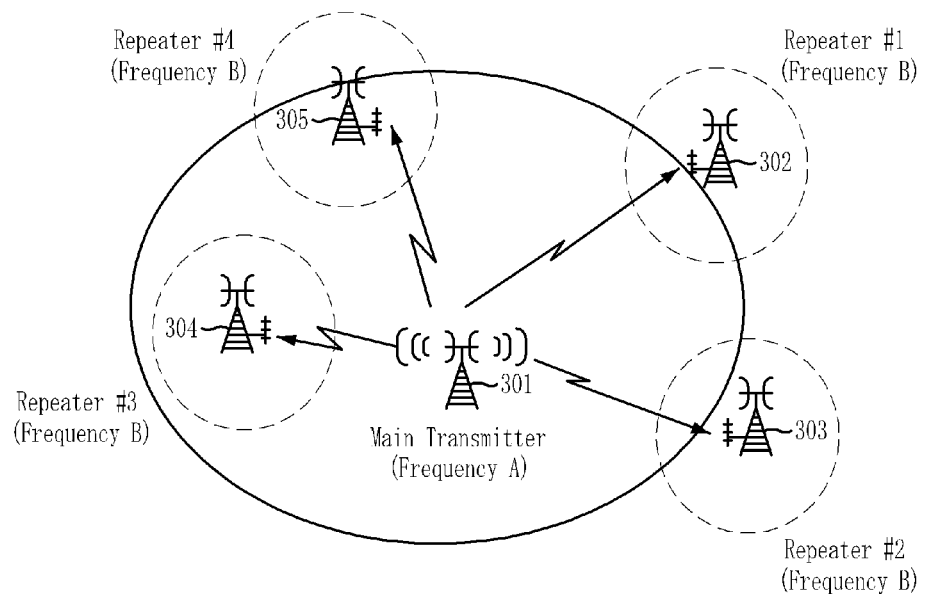
FIG. 3 illustrates an example of a service employing conventional distributed repeaters.
Figure 4:
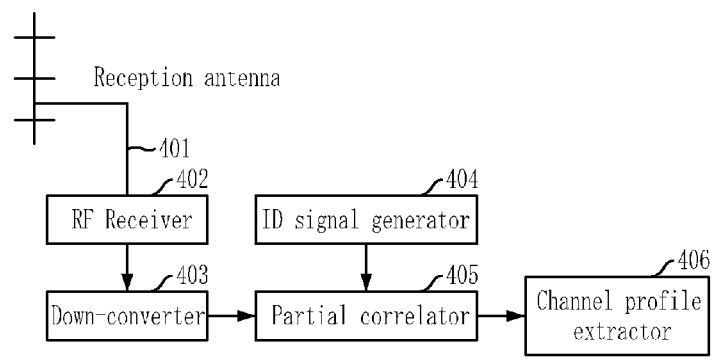
FIG. 4 is a block view showing an identification (ID) signal analyzing apparatus based on partial correlation in accordance with an embodiment of the present invention.

FIG. 4 is a block view showing an identification (ID) signal analyzing apparatus based on partial correlation in accordance with an embodiment of the present invention. Referring to FIG. 4, the ID signal analyzing apparatus using partial correlation includes a reception antenna 401, a radio frequency (RF) receiver 402, a down-converter 403, an ID signal generator 404, a partial correlator 405, and a channel profile extractor 406.

The reception antenna 401 and the RF receiver 402 receive RF signals with an ID signal therein transmitted from a transmitting part, such as a plurality of transmitters or repeaters. The down-converter 403 down-converts the received RF signals into signals of a desired band. The ID signal generator 404 generates the same ID signals as the ID signals added by the transmitting part to the RF signals.

The partial correlator 405 calculates a correlation value between the down-converted signals acquired in the down-converter 403 and the ID signals generated in the ID signal generator 404 based on partial correlation. The channel profile extractor 406 extracts a channel profile of a multi-path signal caused in a channel between the transmitting part and the ID signal analyzing apparatus from the correlation value.

The operation of the ID signal analyzing apparatus suggested in the embodiment of the present invention is described with reference to FIG. 5.

Figure 5:
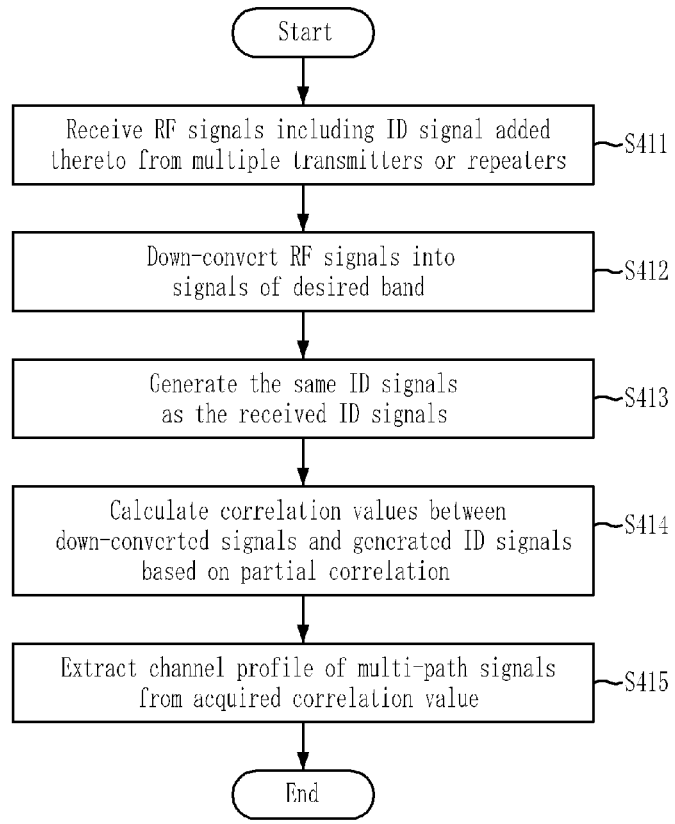
FIG. 5 is a flowchart describing an ID signal analyzing apparatus based on partial correlation in accordance with an embodiment of the present invention.

FIG. 5 is a flowchart describing an ID signal analyzing apparatus based on partial correlation in accordance with an embodiment of the present invention. First, in step S411, RF signals each including an ID signal is received from the transmitting part, such as a plurality of transmitters or repeaters.

In step S412, the received RF signals are down-converted into signals of a desired band.

In step S413, ID signals that are the same as the ID signals added by the transmitting part are generated.

In step S414, correlation values between the down-converted signals and the generated ID signals are calculated based on partial correlation.

In step S415, channel profile of multi-path signals is extracted from the correlation values.

Figure 6:
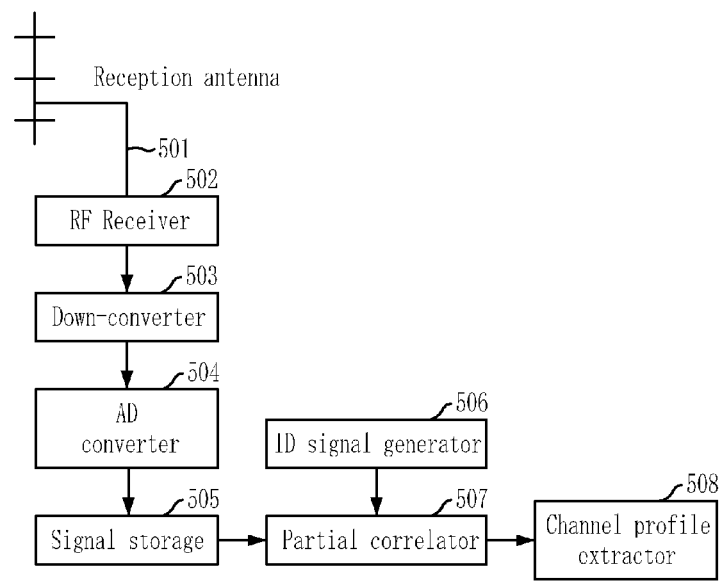
FIG. 6 is a block view describing an ID signal analyzing apparatus based on partial correlation in accordance with another embodiment of the present invention.

FIG. 6 is a block view describing an ID signal analyzing apparatus based on partial correlation in accordance with another embodiment of the present invention.

Referring to FIG. 6, an ID signal analyzing apparatus according to another embodiment of the present invention includes an RF receiver 502, a down-converter 503, an analog-to-digital (AD) converter 504, a signal storage 505, an ID signal generator 506, a partial correlator 507, and a channel profile extractor 508.

The RF receiver 502 receives RF signals with an ID signal therein transmitted from a transmitting part, such as a plurality of transmitters or repeaters, through a reception antenna 501. The down-converter 503 down-converts the received RF signals into signals of a desired band. The analog-to-digital converter 504 converts the analog signals acquired from down-conversion in the down-converter 503 into digital signals. The signal storage 505 stores the digital signals acquired in the analog-to-digital converter 504. The ID signal generator 506 generates the same ID signals as the ID signals added by the transmitting part to the RF signals.

The partial correlator 507 calculates a correlation value between the signals stored in the signal storage 505 and the ID signals generated in the ID signal generator 506 based on partial correlation. The channel profile extractor 508 extracts a channel profile of a multi-path signal caused in a channel between the transmitting part and the ID signal analyzing apparatus from the correlation value calculated in the partial correlator 507.

The operation of the ID signal analyzing apparatus suggested in this embodiment of the present invention is described with reference to FIG. 7.

Figure 7:
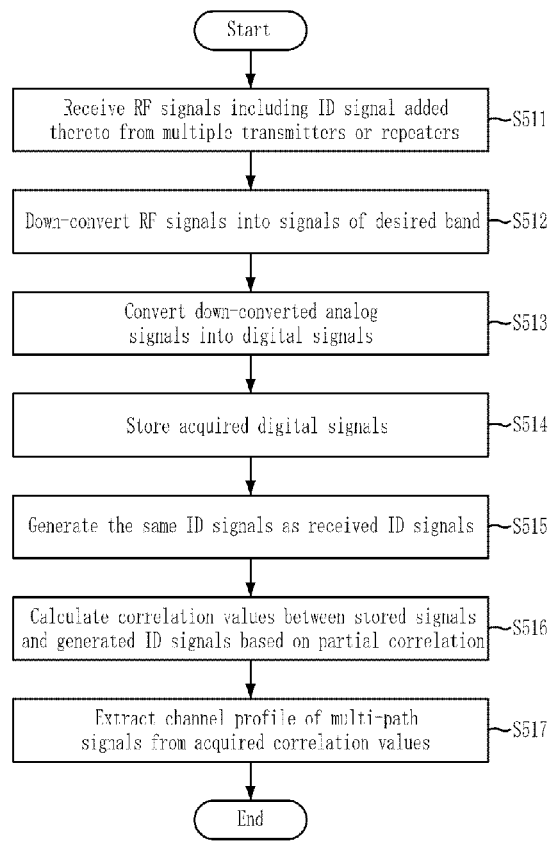
FIG. 7 is a flowchart describing an ID signal analyzing apparatus based on partial correlation in accordance with another embodiment of the present invention.

FIG. 7 is a flowchart describing an ID signal analyzing apparatus based on partial correlation in accordance with another embodiment of the present invention.

First, in step S511, RF signals each including an ID signal is received from the transmitting part, such as a plurality of transmitters or repeaters.

In step S512, the received RF signals are down-converted into signals of a desired band.

In step S513, the analog signals acquired from the down-conversion are converted into digital signals.

In step S514, the digital signals are stored.

In step S515, ID signals that are the same as the ID signals added by the transmitting part are generated.

In step S516, correlation values between the stored signals and the generated ID signals are calculated based on partial correlation.

In step S517, channel profile of multi-path signals is extracted from the calculated correlation values.

Figure 8:
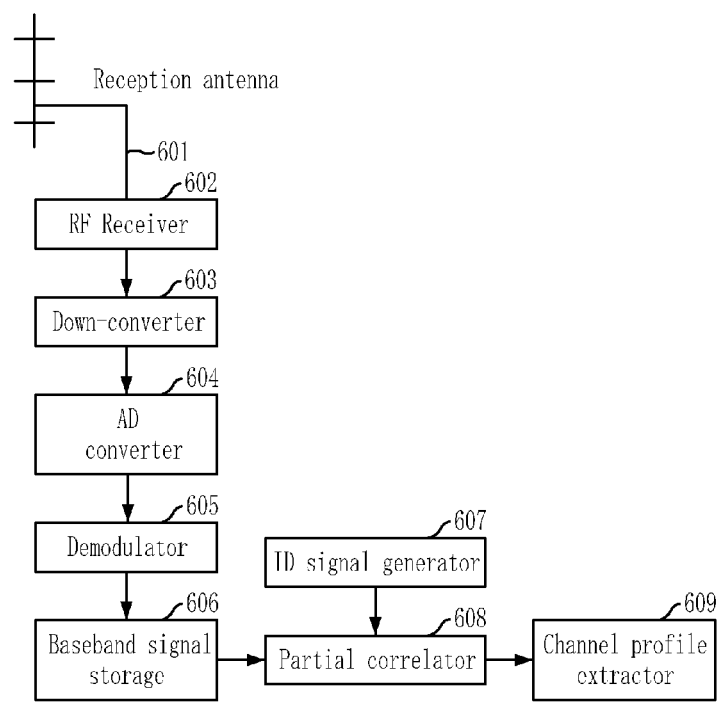
FIG. 8 is a block view illustrating an ID signal analyzing apparatus based on partial correlation in accordance with yet another embodiment of the present invention.

FIG. 8 is a block view illustrating an ID signal analyzing apparatus based on partial correlation in accordance with yet another embodiment of the present invention.

Referring to FIG. 8, an ID signal analyzing apparatus according to another embodiment of the present invention includes an RF receiver 602, a down-converter 603, an analog-to-digital (AD) converter 604, a demodulator 605, a baseband signal storage 606, an ID signal generator 607, a partial correlator 608, and a channel profile extractor 609.

The RF receiver 602 receives RF signals with an ID signal therein transmitted from a transmitting part, such as a plurality of transmitters or repeaters, through a reception antenna 601. The down-converter 603 down-converts the received RF signals into signals of a desired band. The analog-to-digital converter 604 converts the analog signals acquired from down-conversion in the down-converter 603 into digital signals. The demodulator 605 demodulates the digital signals acquired from the analog-to-digital converter 604 into baseband signals. The baseband signal storage 606 stores the baseband signals acquired from the demodulation in the demodulator 605. The ID signal generator 506 generates the same ID signals as the ID signals added by the transmitting part to the RF signals.

The partial correlator 608 calculates a correlation value between the signals stored in the baseband signal storage 606 and the ID signals generated in the ID signal generator 607 based on partial correlation. The channel profile extractor 609 extracts a channel profile of a multi-path signal caused in a channel between the transmitting part and the ID signal analyzing apparatus from the correlation value calculated in the partial correlator 608.

The operation of the ID signal analyzing apparatus suggested in this embodiment of the present invention is described with reference to FIG. 9.

Figure 9:
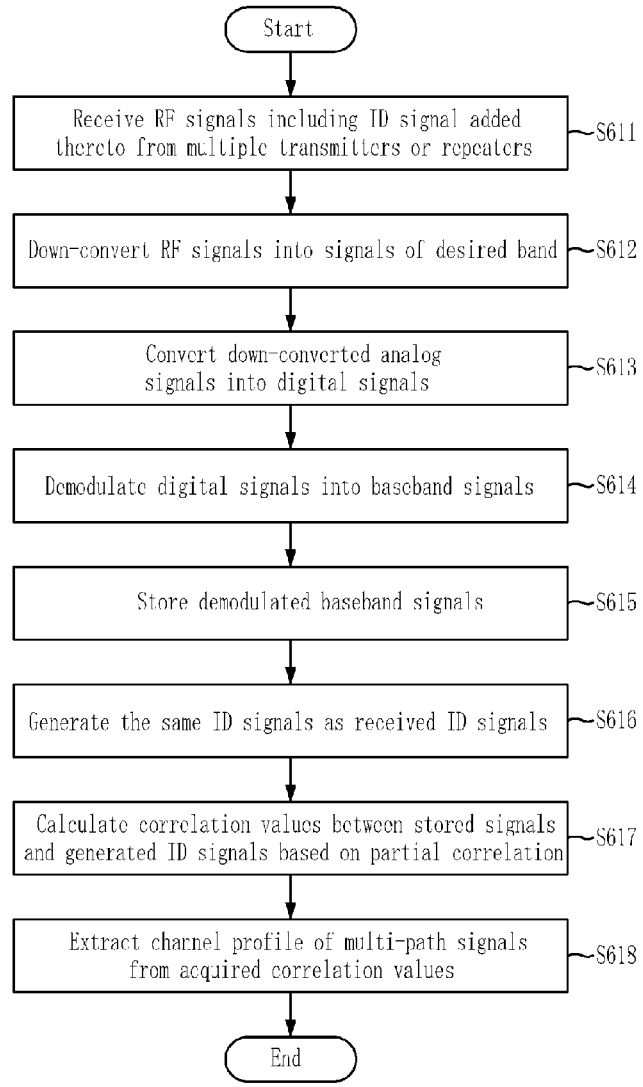
FIG. 9 is a flowchart describing an ID signal analyzing apparatus based on partial correlation in accordance with yet another embodiment of the present invention.

FIG. 9 is a flowchart describing an ID signal analyzing apparatus based on partial correlation in accordance with yet another embodiment of the present invention.

First, in step S611, RF signals each including an ID signal is received from the transmitting part, such as a plurality of transmitters or repeaters.

In step S612, the received RF signals are down-converted into signals of a desired band.

In step S613, the analog signals acquired from the down-conversion are converted into digital signals.

In step S614, the digital signals are demodulated into baseband signals.

In step S615, the baseband signals acquired from the demodulation are stored.

In step S616, ID signals that are the same as the ID signals added by the transmitting part are generated.

In step S617, correlation values between the stored signals and the generated ID signals are calculated based on partial correlation.

In step S618, channel profile of multi-path signals is extracted from the calculated correlation values.

Meanwhile, it is possible to realize the demodulator 605, the baseband signal storage 606, the ID signal generator 404, 506 or 607, and the partial correlator 405, 507 and 608 in diverse forms according to system standards. Hereinafter, an embodiment conforming to the ATSC DTV Standards is described in detail with reference to the accompanying drawings.

Figure 10:
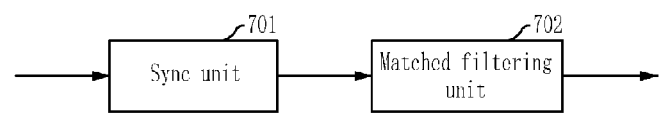
FIG. 10 is a block view showing a structure of a demodulator according to Advanced Television System Committee (ATSC) Digital Television (DTV) Standard.

FIG. 10 is a block view showing a structure of a demodulator according to Advanced Television System Committee (ATSC) Digital Television (DTV) Standard.

Referring to FIG. 7, a sync unit 701 removes frequency and timing offset from digital signals acquired from the conversion in the analog-to-digital converter 604, signals whose frequency and timing offset is removed in the sync unit 701 become baseband signals with a maximal signal-to-noise ratio after a matched filtering unit 702.

Figure 11:
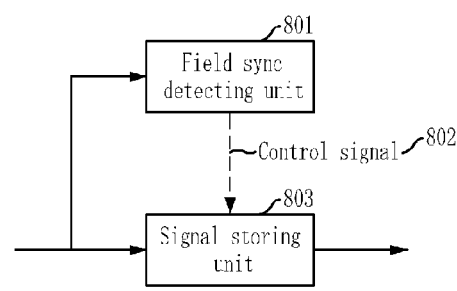
FIG. 11 is a block view showing a structure of a baseband signal storage according to ATSC DTV Standard.

FIG. 11 is a block view showing a structure of a baseband signal storage according to ATSC DTV Standard.

Referring to FIG. 11, a field sync detecting unit 606 detects a field synchronization signal from the baseband signals generated in the matched filtering unit 702 of the demodulator 605 and transmits a control signal acquired based on whether the field sync is detected or not to a signal storing unit 803. When the control signal 802 from the field sync detecting unit 801 is a control signal informing that a field sync signal is detected, the signal storing unit 803 stores only data signals. When the control signal 802 from the field sync detecting unit 801 is a control signal informing that a field sync signal is not detected, the signal storing unit 803 stores both data signals and field sync signal.

Figure 12:
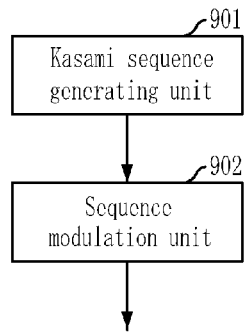
FIG. 12 is a block view showing a structure of an ID signal generator according to ATSC DTV Standard.

FIG. 12 is a block view showing a structure of an ID signal generator according to ATSC DTV Standard.

Referring to FIG. 12, a Kasami sequence generating unit 901 generates a Kasami sequence whose length is 65535. The generated Kasami sequence goes through Binary Phase Shift Keying (BPSK) modulation in a sequence modulation unit 902 and transmitted to the partial correlator 507.

Figure 13:
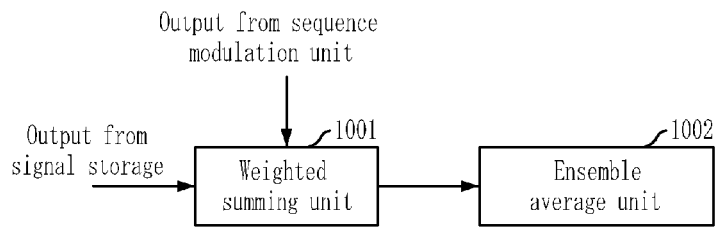
FIG. 13 is a block view showing a structure of a partial correlator according to ATSC DTV Standard.
Figure 14:
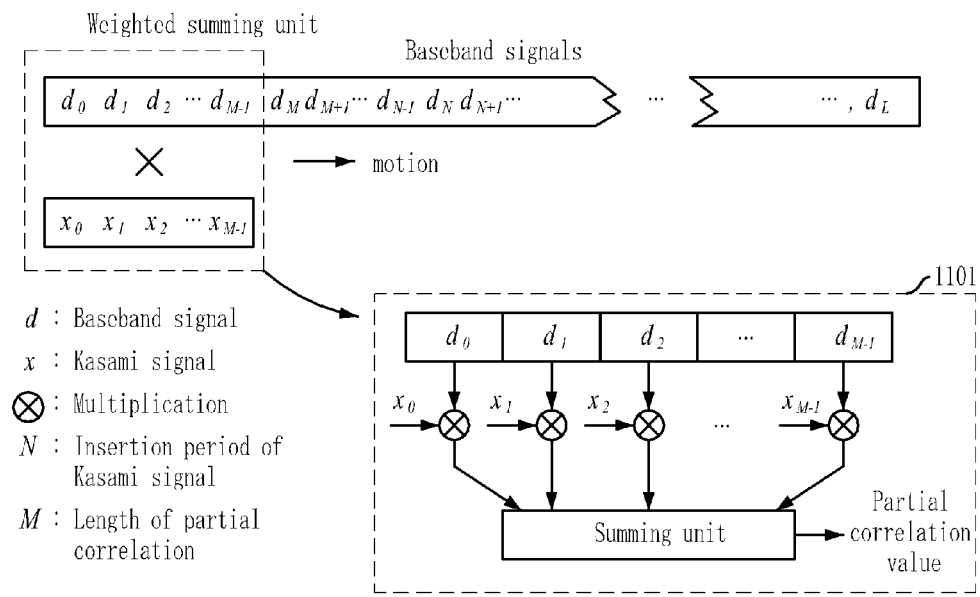
FIG. 14 is a block view showing a structure of a weighted summing unit according to ATSC DTV Standard.

FIG. 13 is a block view showing a structure of a partial correlator according to ATSC DTV Standard. FIG. 14 is a block view showing a structure of a weighted summing unit according to ATSC DTV Standard.

Referring to FIG. 13, a weighted summing unit 1001 calculates a partial correlation value between the reception signal stored in the signal storing unit 803 of the baseband signal storage 606 and the ID signals generated in the sequence modulation unit 902 of the ID signal generator 607, and the partial correlation value acquired in the weighted summing unit 1001 is average-accumulated in an ensemble average unit 1002 and transmitted to a channel profile extractor.

Herein, the reception signals inputted to the weighted summing unit 1001 may be the signals acquired from the down-conversion in the down-converter 403, which is shown in FIGS. 4 and 5, or they may be the reception signals stored in the signal storage 505, which is shown in FIGS. 6 and 7. Since other operations are all the same, only one embodiment will be described hereinafter.

Referring to Equations 1 and 2, the operation of the weighted summing unit 1001 and the ensemble average unit 1002 will be described according to another embodiment of the present invention.

First, ID signals ($x_0, x_1, \ldots, x_{M-1}$) are taken as many as desired (M) from the ID signals ($x_0, x_1, \ldots, x_{N-1}$) generated in the ID signal generator 607. Herein, N denotes the length of ID signals added in a transmitter or a repeater and M≤N. In short, N is an addition period. Then, a correlation value ($v_i$, 0≤i<N) between the ID signals ($x_0, x_1, \ldots, x_{M-1}$) taken as long as the partial correlation length and the baseband signals ($d_0, d_1, \ldots, d_{M-1}, d_M, d_{M+1}, \ldots, d_{N-1}, d_N, d_{N+1}, \ldots, d_L$) stored in the baseband signal storage 606 is calculated in the weighted summing unit 1101 based on the following Equation 1. Herein, L denotes the length of the stored signals.

$$v_i = \frac{1}{M} \sum_{j=0}^{M-1} d_{i+j} x_j, \qquad \text{Eq. 1}$$

$$0 \leq i < L - M$$

The correlation value calculated based on the Equation 1 is averaged by a frequency number K predetermined in the ensemble average unit 1002 based on the following Equation 2.

$$c_l = \frac{1}{K} \sum_{k=0}^{K-1} v_{kN+l}, \qquad \text{Eq. 2}$$

$$0 \leq l < N$$

The ID signal analyzing apparatus and method based on partial correlation, which is suggested in the present invention, is appropriate for broadcasting and/or communication. However, the applicable range of present invention is not limited to them, and the present invention may be applied to all environment requiring general ID signals.

As described above, the method of the present invention can be realized as a program and stored in a computer-readable recording medium such as CD-ROM, ROM, RAM, floppy disks, hard disks, magneto-optical disks and the like. Since the process can be easily implemented by those of ordinary skill in the art of the present invention, further description will not be provided herein.

The present invention described above can realize an ID signal analyzing apparatus having high bit resolution and low complexity for analyzing long ID signals.

To be specific, the present invention realizes an apparatus for analyzing ID signals by converting RF signals which are transmitted with an ID signal added thereto from a transmitting part, e.g., a plurality of transmitters or repeaters, into signals of a desired band; creating ID signals that are identical to the ID signals added to the RF signals; calculating correlation values between the converted signals and the created ID signals based on partial correlation; and extracting channel profile of multi-path signals caused by a channel between the transmitting part and the ID signal analyzing apparatus from the correlation values.

The present application contains subject matter related to Korean Patent Application No. 2006-0106526, filed in the Korean Intellectual Property Office on Oct. 31, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. An apparatus for analyzing identification (ID) signals, comprising:
   a receiver for receiving a signal with an ID signal added thereto from a transmitting part, wherein the ID signal added has a length N;
   a signal converter for converting the received signal into a signal of a desired band;
   an ID signal generator for generating ID signals that are identical to the ID signals added by the transmitting part to the received signal,
   wherein the generated ID signals that are identical to the ID signals have a length of M, and wherein M is less than N;
   a partial correlator for calculating partial correlation values between the converted signals acquired in the signal converter and the created ID signals acquired in the ID signal generator based on partial correlation; and
   extracting a channel profile for the received signal, and
   wherein the extracted channel profile is configured from the partial correlation values acquired in the partial correlator.

2. The apparatus of claim 1, wherein the partial correlator comprises:
   a weighted summing unit for calculating the partial correlation values between the converted signal acquired in the signal converter and the created ID signals acquired in the ID signal generator; and
   an ensemble average unit for acquiring an accumulated average of the partial correlation values calculated in the weighted summing unit.

3. The apparatus of claim 2, wherein the weighted summing unit takes ID signals as much as a partial correlation length of M from the generated ID signals acquired in the ID signal generator, and calculates the partial correlation values between the ID signals taken as much as the partial correlation length and the converted signals acquired in the signal converter, where the partial correlation length of M denotes a length of ID signals for partial correlation.

4. The apparatus of claim 1, wherein the ID signal generator comprises:
   a Kasami sequence generating unit for generating a Kasami sequence having a predetermined length; and a sequence modulation unit for modulating the generated Kasami sequence through Binary Phase Shift Keying (BPSK).

5. The apparatus of claim 1, wherein the signal converter comprises:
a down-converter for down-converting RF signals received in the receiver into signals of a desired band.

6. The apparatus of claim 5, wherein the signal converter further comprises:
an analog-to-digital (AD) converter for converting analog signals acquired from the down-conversion in the down-converter into digital signals; and
a signal storage for storing the digital signals acquired in the analog-to-digital converter.

7. The apparatus of claim 1, wherein the signal converter includes further comprises:
a down-converter for down-converting RF signals received in the receiver into signals of a desired band;
an analog-to-digital converter for converting analog signals acquired from the down-conversion in the down-converter into digital signals;
a modulator for modulating the digital signals acquired in the analog-to-digital converter into baseband signals; and
a baseband signal storage for storing the modulated digital signals acquired in the modulator.

8. A method for analyzing identification (ID) signals, comprising the steps of:
a) receiving a signal with an ID signal added thereto, and wherein the ID signal added has a length N;
b) converting the received signal into a signal of a desired band;
c) generating ID signals that are identical to the ID signals added to the received signal, wherein the generated ID signals that are identical to the ID signals have a length of M, and wherein M is less than N;
d) calculating partial correlation values between the converted signal acquired from the signal conversion step b) and the created ID signals acquired in the ID signal generation step c) based on partial correlation; and
e) extracting a channel profile from the partial correlation values acquired in the partial correlation step d).

9. The method of claim 8, wherein the partial correlation step d) comprises:
d1) calculating the partial correlation values between the converted signal and the created ID signals; and
d2) acquiring an accumulated average of the partial correlation values calculated in the step d1).

10. The method of claim 9, wherein, in the step d1), the ID signals are taken as much as a partial correlation length of M from the generated ID signals acquired in the ID signal generator, and the partial correlation values between the ID signals taken as much as the partial correlation length and the converted signals acquired in the signal converter are calculated, where the partial correlation length denotes a length of ID signals for the partial correlation.

11. The method of claim 8, wherein the ID signal generation step c) comprises: c1) generating a Kasami sequence having a predetermined length; and c2) modulating the generated Kasami sequence through Binary Phase Shift Keying (BPSK).

12. An apparatus for analyzing identification (ID) signals, comprising:
a receiver for receiving signals with an ID signal added thereto from a transmitting part;
a signal converter for converting the received signals into signals of a desired band;
an ID signal generator for generating ID signals that are identical to the ID signals added by the transmitting part to the received signals,
wherein generated ID signals comprises a sequence having a predetermined length;
a partial correlator for calculating correlation values between the converted signals acquired in the signal converter and the created ID signals acquired in the ID signal generator based on partial correlation, and
wherein the partial correlation has a length less than the predetermined length for the sequence of the generated ID signals; and
extracting channel profile from the correlation values acquired in the partial correlator, and
wherein the correlation value are configured based on the predetermined length for the sequence of the generated ID signals.

* * * * *